United States Patent [19]
Spencer et al.

[11] Patent Number: 5,803,486
[45] Date of Patent: Sep. 8, 1998

[54] AIR BAG MODULE WITH MOUNTING AND DIFFUSER BRACKET

[75] Inventors: Graham Thornton Spencer, Tipp City; James Lloyd Webber, Centerville; Margaret Ann Fisher, Huber Heights; John Paul Sparkman, Dayton; Mark Harvey Doxey, Troy, all of Ohio

[73] Assignee: General Motors Corporation, Detroit, Mich.

[21] Appl. No.: 767,884

[22] Filed: Dec. 17, 1996

[51] Int. Cl.6 .................................................. B60R 21/16
[52] U.S. Cl. ..................... 280/728.2; 280/730.2; 280/736; 280/742
[58] Field of Search ........................... 280/730.2, 730.1, 280/728.2, 740, 742, 736

[56] References Cited

U.S. PATENT DOCUMENTS

| | | | |
|---|---|---|---|
| 4,964,654 | 10/1990 | Bishop et al. | 280/728.2 |
| 5,536,041 | 7/1996 | Acker et al. | 280/740 |
| 5,564,739 | 10/1996 | Davidson | 280/736 |
| 5,611,563 | 3/1997 | Olson et al. | 280/728.2 |
| 5,613,704 | 3/1997 | White, Jr. et al. | 280/728.2 |

OTHER PUBLICATIONS

U.S. application No. 08/618,322, Logan et al., filed Mar. 19, 1996.

*Primary Examiner*—Eric D. Culbreth
*Attorney, Agent, or Firm*—Kathryn A. Marra

[57] ABSTRACT

An air bag module includes an inflator and an air bag for inflation upon the discharge of gas by the inflator. The module further includes a mounting and diffuser bracket for securing the inflator and air bag to the vehicle. The mounting and diffuser bracket includes a diffuser portion positioned radially outward of the discharge end of the inflator. The diffuser portion preferably includes wing portions substantially surrounding the discharge ports of the inflator such that upon discharge of gas by the inflator, the wing portions redirect and diffuse the discharging inflator gas into the air bag. Advantageously, the wing portions also provide a localized heat shield for the air bag.

23 Claims, 5 Drawing Sheets

AIR BAG MODULE WITH MOUNTING AND DIFFUSER BRACKET

TECHNICAL FIELD

This invention relates to an air bag module for use in a vehicle including a device for diffusing gas discharged by an inflator.

BACKGROUND OF THE INVENTION

It is well known in motor vehicles to provide an air bag module for protecting a vehicle occupant. It is also known to provide an air bag module including an air bag and an inflator for generating gas to inflate the air bag upon sensing predetermined vehicle conditions. The air bag module may also include an inflator bracket which is external to the air bag and to which the respective ends of the inflator are mounted. The air bag, inflator and inflator bracket are typically stored within a housing having a cover prior to deployment of the air bag out through the cover.

It is also typical to have a thrust neutral inflator having the gas discharge openings located at one end of the inflator. Since the inflator gas is discharged from only one end of the inflator, the air bag may be filled unevenly so that one side inflates faster than the other. In some cases, it may be desirable that the discharging inflator gas from the inflator be distributed more evenly into the inflating air bag for even, unbiased air bag inflation. In addition, the inflator heat is localized on a single portion of the air bag.

The prior art has addressed these problems by providing a separate diffuser plate which is typically mounted across the axial length of the housing atop or around the inflator so that discharging inflator gas passes through openings in the diffuser plate to redistribute the discharging inflator gas more evenly into the inflating air bag. The addition of a diffuser plate adds time, cost and mass to the air bag module. In addition, the prior art teaches the use of heat shields internal to the air bag for protecting the air bag from inflator heat.

SUMMARY OF THE INVENTION

This invention provides advantages and alternatives over the prior art by providing an air bag module including a single device in a single location that can serve the multiple purposes of securing the air bag and inflator to the vehicle, diffusing and redirecting the inflator gas more evenly into the deploying air bag, and serving as a heat shield to prevent localized heating of the air bag by inflator heat. This invention preferably provides a single component that serves these multiple functions, thus enabling elimination of parts from the air bag module. In addition, the invention preferably provides a module having an improved compact and lightweight device for both securing the air bag and inflator to the vehicle and also diffusing the inflator gas discharged at one end of the inflator without requiring a large or bulky separate structure as shown in the prior art. In addition, this device does not require attachment to a sturdy housing and advantageously may be utilized in an air bag module with or without a housing.

These advantages are accomplished in a preferred form of the invention by providing an air bag module for attachment to a vehicle. The air bag module includes an axially elongated inflator for generating inflator gas. The inflator includes an elongated body portion and a discharge end having discharge ports for discharging inflator gas therethrough. The module includes an air bag deployable upon generation of inflator gas. A mounting and diffuser bracket is attached to the inflator. The inflator and the mounting and diffuser bracket are positioned substantially within the air bag and the mounting and diffuser bracket secures the inflator and air bag to the vehicle. The mounting and diffuser bracket includes a diffuser portion positioned radially outward of the discharge end of the inflator. Preferably, the diffuser portion is integrally formed with the mounting and diffuser bracket so that mounting, heat shielding and diffusion functions are all provided by a single, integral component.

Preferably, the diffuser portion includes at least one wing portion substantially surrounding the discharge ports of the inflator such that upon discharge of gas by the inflator, the wing portion redirects and diffuses the discharging inflator gas into the air bag. Preferably, the wing portion is deformable and the wing portion moves between an undeformed condition prior to the discharge of inflator gas and a deformed condition upon discharge of inflator gas. The wing portion is spaced further radially outward from the discharge ports in the deformed condition than in the undeformed condition.

Preferably, the diffuser portion may include two wing portions which are positioned on diametrically opposed sides of the discharge end and cooperate to substantially surround the discharge ports. The wing portions each preferably include a free end and an opposite hinged end. The wing portions pivot open about the hinged ends to the deformed condition upon the discharge of inflator gas. Preferably, the free ends of the wing portions define a slitted opening therebetween when the wing portions are in the undeformed condition and the slitted opening is enlarged when the wing portions are moved radially outward to the deformed condition.

In accordance with other preferred aspects of the invention, the inflator has a solid end axially opposing the discharge end and the mounting and diffuser bracket has a central portion adapted to be secured to the vehicle. The central portion is axially elongated and extends generally between the ends of the inflator and the wing portions each include a tapered portion positioned axially inward of the discharge end and terminating in an axially elongated flared rib portion extending substantially along the central portion towards the solid end and extending generally upwardly from the central portion. Also preferably, the hinged ends of the wing portions are preferably attached to the central portion. In addition, the mounting and diffuser bracket preferably includes a laterally bent end for capturing the discharge end of the inflator therein at a location axially outward of the discharge ports and the wing portions are positioned generally axially inward of the laterally bent end.

According to yet other preferred aspects of the invention, the free ends of the wing portions may be operatively connected together such that the slitted opening is eliminated and such that the wing portions are not deformable in a radially outward direction upon the discharge of inflator gas. Thus, the diffuser portions distributes the inflator gas more evenly into the air bag in generally the same manner throughout deployment.

Advantageously, the mounting and diffuser bracket serves the multiple functions of securing the inflator and air bag to the vehicle, redirecting and diffusing the discharging inflator gas more evenly into the air bag via the wing portions, and providing a heat shield for the air bag in addition. Advantageously, the wing portions, which are initially undeformed, allow for a more compact mounting and diffuser bracket for easier assembly within the air bag. Also advantageously, the mounting and diffuser bracket is preferably formed of a single integral generally planar piece of material which is bent to the shape of the mounting and diffuser bracket for reduction of parts and ease of manufacturing.

BRIEF DESCRIPTION OF THE DRAWINGS

An embodiment of the present invention is described below, by way of example only, with reference to the accompanying drawings in which.

DESCRIPTION OF THE PREFERRED EMBODIMENT

Figure 1:
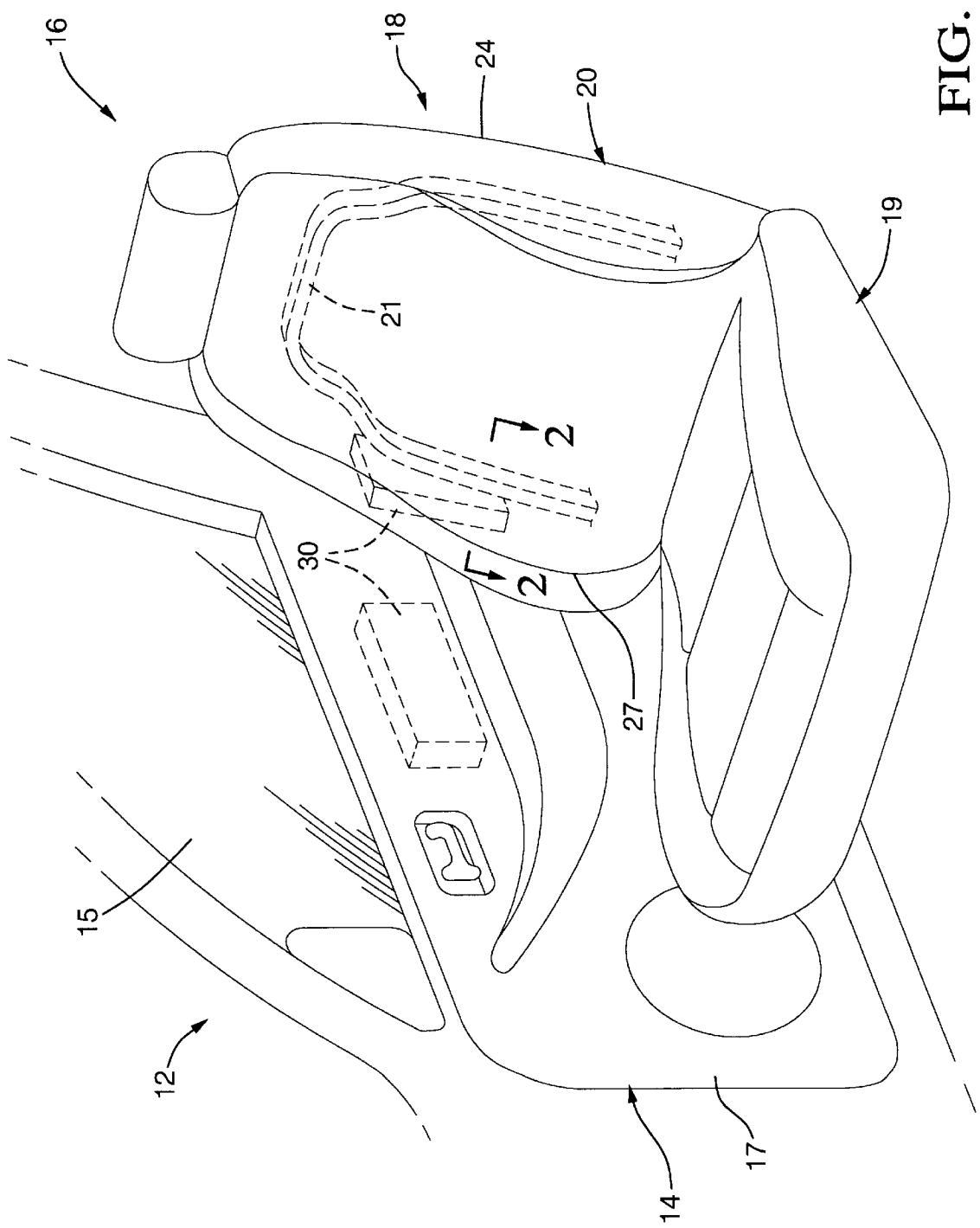
FIG. 1 is a perspective view of a vehicle interior partially broken away and including an air bag module in an undeployed condition.
Figure 3:
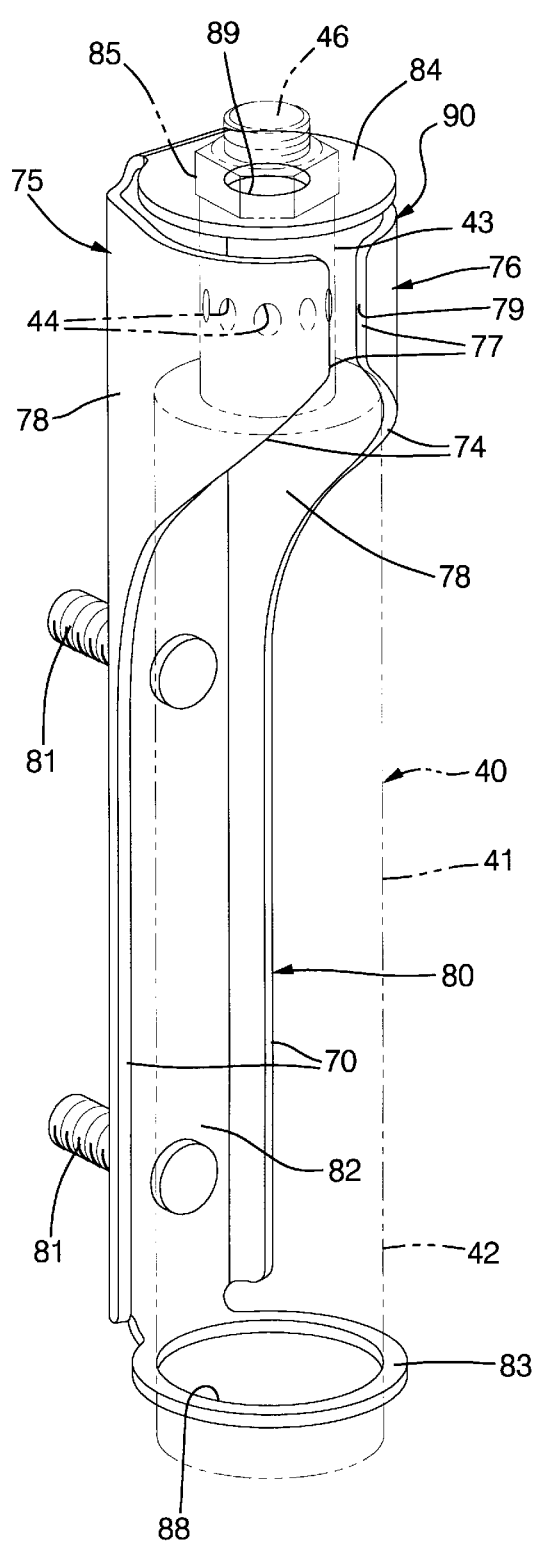
FIG. 3 is a perspective view of a mounting and diffuser bracket of the module of FIGS. 1–2 shown in an undeformed condition with an inflator shown in phantom lines.

Referring to FIG. 1, it is seen that a vehicle 12 includes a door 14 having a movable window 15 mounted thereon. An interior 16 of the vehicle 12 includes an inner door panel 17 and a seat 18 for a vehicle occupant (not shown), the seat 18 having a seat bottom 19 and an upper seat back 20. The seat back 20 includes a rigid seat frame 21, preferably being metal, and encompassed within the seat back 20. Referring to FIGS. 1 and 3, the seat back 20 is preferably formed of a foam material 23 covered by fabric seat material 24. The seat back 20 preferably includes a vertically extending seat seam 27 proximate the inner door panel 17.

Figure 2:
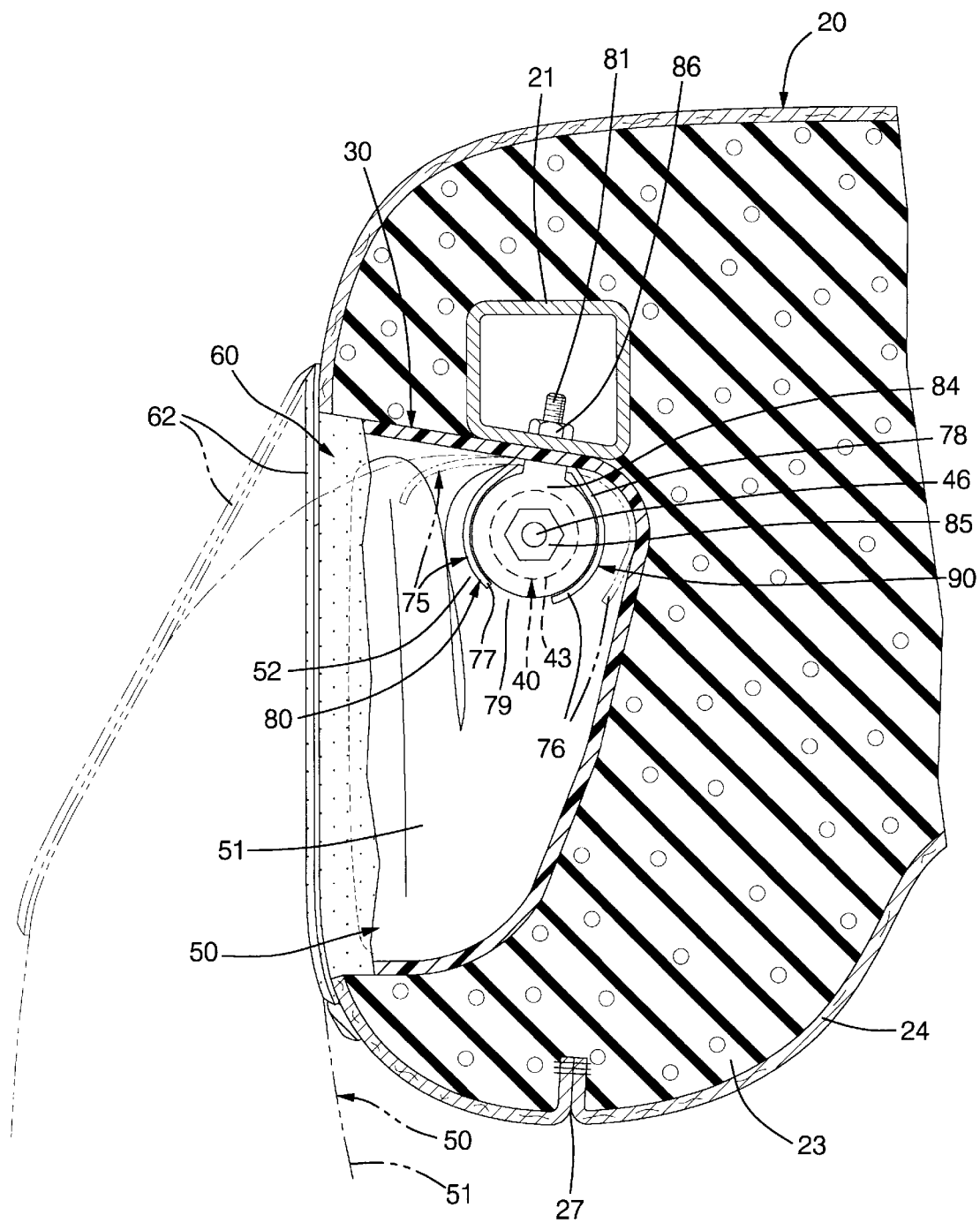
FIG. 2 is a section as viewed along line 2—2 of FIG. 1 and showing the air bag module in the undeployed condition and showing an air bag and cover door in the deployed condition in phantom lines.

FIG. 2 best illustrates the component parts of a complete air bag module 30 preferably located within the seat back 20. However, it will also be appreciated that the air bag module 30 may alternately be mounted anywhere in the vehicle 12, but is especially well-adapted to also be mounted in various locations in the door 14 as shown in phantom lines in FIG. 1, but could also be mounted in the seat bottom 19, roof, vehicle side structure or instrument panel (not shown). The module 30 generally includes an inflator 40, an air bag 50 for inflation upon generation of gas by the inflator 40, a plastic molded container 60 for housing the inflator 40 and air bag 50 therein, and a mounting and diffuser bracket 80 for mounting the air bag 50 and inflator 40 to the seat frame 21 and for redirecting and diffusing discharging inflator gas during air bag deployment, as described further hereinafter.

Figure 4:
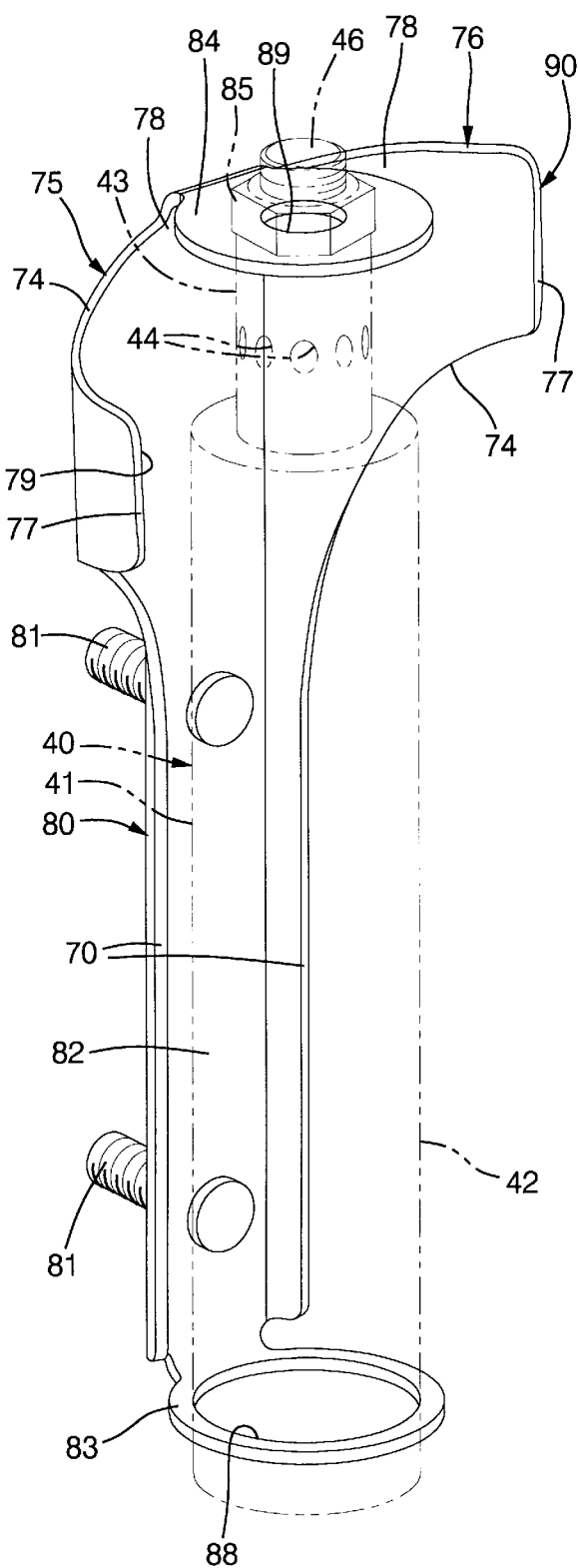
FIG. 4 is a perspective view of the mounting and diffuser bracket similar to FIG. 3, but showing the mounting and diffuser bracket in a deformed condition after the discharge of inflator gas from the inflator.

As best shown in FIGS. 3 and 4 in phantom lines, the inflator 40 may be of any conventional construction which contains chemicals for igniting to generate gas for discharge upon the existence of predetermined vehicle 12 conditions. The axially elongated inflator 40 preferably includes an axially elongated cylindrical body portion 41 having a generally plain, solid end 42 and an opposite discharge end 43 including discharge ports 44 through which inflator gas is discharged in a thrust neutral manner to inflate the air bag 50. The discharge end 43 of the inflator 40 preferably has a diameter which is less than a diameter of the body portion 41 of the inflator 40. An axially extending threaded end portion 46 has a reduced diameter and preferably extends from the discharge end 43 of the inflator 40 for attachment to the mounting and diffuser bracket 80, as described further hereinafter. The elongated axis of the inflator 40 is preferably positioned generally vertical and generally parallel with the seat back 20 when the module 30 is mounted in the seat 18. The inflator 40 is anchored to the seat frame 21 via the mounting and diffuser bracket 80, as described further hereinafter.

As best shown in FIG. 2, the air bag 50 is made of any conventional fabric material which is suitable for air bag construction. The air bag 50 includes a folded main body portion 51 which is inflatable upon the discharge of inflator gas as shown in phantom lines in FIG. 2. The air bag 50 may also includes a neck portion 52 preferably being an extension of the air bag fabric material. The air bag 50 includes at least one side opening (not shown) sized for receiving the inflator 40 and mounting and diffuser bracket 80 therethrough and into the air bag 50. The air bag 50 is coupled to the inflator 40 and the vehicle 12 by the mounting and diffuser bracket 80. The neck portion 52 may also define an inner air bag passage through which inflator gas passes to inflate the main body portion 51 of the air bag 50. It will be appreciated that the air bag 50 including the main body portion 51 and the neck portion 52 may be made of a single piece of fabric or several fabric panels joined together. The air bag 50 is stored in a suitably folded condition within the container 60 prior to inflation.

As best shown in FIG. 2, the container 60 is preferably integrally molded of a plastic material and preferably includes an integrally molded cover door 62 which includes weakened portions that permit the cover door 62 to break open upon air bag 50 deployment as shown in phantom lines in FIG. 2. The cover door 62 preferably provides a show surface on the outer surface of the seat back 20. However, it will be appreciated that the container 60 could also be stored beneath the foam material 23 or fabric seat material 24. The container 60 is preferably secured to the seat frame 21 or other suitable vehicle structure via the mounting and diffuser bracket 80, as described further hereinafter. It will also be appreciated that the container 60 could be eliminated and that the module 30 could be a soft-pack type including the inflator 40, mounting and diffuser bracket 80, and air bag 50 with the air bag 50 deploying through a frangible portion of the seat 18 such as the seat seam 27.

As best shown in FIGS. 3 and 4, the module 30 preferably includes a mounting and diffuser bracket 80 having an axially elongated central portion 82 and laterally bent first and second apertured bracket ends 83, 84. The first apertured bracket end 83 has a first end opening 88 sized for receiving the solid end 42 of the inflator 40 therein and the second apertured bracket end 84 has a second end opening 89 sized for receiving the threaded end portion 46 of the discharge end 43 therein. The first and second end openings 88, 89 preferably have centers which are coaxially aligned such that the elongated axis of the inflator 40 extends parallel to, but spaced above, the elongated central portion 82 of the mounting and diffuser bracket 80 in the assembled condition. The mounting and diffuser bracket 80 further includes outwardly projecting mounting fasteners 81 connected to the central portion 82 and extending out through corresponding aligned apertures (not shown) in the air bag 50 and container 60 for attachment to the seat frame 21.

The mounting and diffuser bracket 80 further includes a diffuser portion 90 which is preferably concentric with the discharge end 43 of the inflator 40 and is positioned radially outward of the discharge end 43 of the inflator 40. The diffuser portion 90 substantially surrounds the discharge ports 44 of the inflator 40 and is spaced radially outward therefrom. The diffuser portion 90 preferably includes two wing portions 75, 76 positioned on diametrically opposed sides of the discharge end 43. The diffuser portion 90 including wing portions 75, 76 are positioned generally axially inward of the second laterally bent bracket end 84 of the mounting and diffuser bracket 80, but preferably are not attached thereto for permitting movement of the wing portions 75, 76 during discharge of inflator gas, as described further hereinafter.

The diffuser portion 90 including the wing portions 75, 76 advantageously redirects and diffuses the discharging inflator gas more evenly throughout the air bag 50 during inflation, as described in more detail below. In addition, the diffuser portion 90 advantageously is positioned between the discharge ports 44 and the air bag 50 for protecting the air bag 50 from heat associated with the discharging inflator gas and preferably eliminating the need for a separate heat shield in the air bag 50. The mounting and diffuser bracket 80 including the diffuser portion 90 can accomplish these objectives by advantageously being located internal to the air bag 50 when the module 30 is assembled.

The mounting and diffuser bracket 80 including the diffuser portion 90 are preferably integrally formed from a single material. Preferably, the mounting and diffuser bracket 80 is formed from a generally planar piece of material which is bent to the final shape of the mounting and diffuser bracket 80. Advantageously, the mounting and diffuser bracket 80 is easy to manufacture. It will be appreciated that other materials such as plastic or composites could also be used to integrally form the mounting and diffuser bracket 80, such as by molding. It will also be appreciated that while the mounting and diffuser bracket 80 is preferably formed from a single integral piece, it may also be made of several pieces bonded, welded or otherwise joined together.

The wing portions 75, 76 are preferably deformable and are movable between an undeformed condition prior to the discharge of inflator gas, as shown in FIG. 3 and in solid lines in FIG. 2, and a deformed condition upon discharge of inflator gas by the inflator 40, as shown in FIG. 4 and in phantom lines in FIG. 2. The wing portions 75, 76 are spaced further radially outward from the discharge ports 44 in the deformed condition than in the undeformed condition. The wing portions 75, 76 extend radially outward from the central portion 82 for substantially surrounding the gas discharge ports 44. The wing portions 75, 76 each include a free end 77 and an opposite hinged end 78. The hinged ends 78 are integrally attached to the central portion 82 and the wing portions 75, 76 pivot open and radially outward about the hinged ends 78 to the deformed condition during the discharge of inflator gas. The free ends 77 of the wing portions 75, 76 cooperatively define an axially extending slitted opening 79 therebetween when the wing portions 75, 76 are in the undeformed condition, as best shown in FIG. 3 and in solid lines in FIG. 2. It will be appreciated that the slitted opening 79 is enlarged when the wing portions 75, 76 are moved radially outward to the deformed condition, as best shown in FIG. 4 and in phantom lines in FIG. 2.

The wing portions 75, 76 each preferably include a tapered portion 74 positioned axially inward of the discharge end 43. The mounting and diffuser bracket 80 further includes an axially elongated flared rib portion 70 extending substantially along the axial length of the central portion 82 between the first bracket end 83 and the tapered portions 74 of the wing portions 75, 76. The flared rib portions 70 extend generally upward and outward from the central portion 82 for stiffening the central portion 82 and for assisting with the redirection and diffusion of inflator gas into the air bag 50. The flared rib portions 70 preferably have a height which is significantly less than the height of the wing portions 75, 76.

It will be appreciated that a predetermined strength of the wing portions 75, 76 and thus the amount of deformation of the wing portions 75, 76 may be controlled by a predetermined selection of material thickness and other material properties which allows for deformation of the wing portions 75, 76 during air bag 50 deployment. It will also be appreciated that the mounting and diffuser bracket 80 has an axial length slightly less than that of the inflator 40 such that the threaded end portion 46 extends out beyond the second apertured bracket end 84 for attachment of an end nut 85 thereto to secure the mounting and diffuser bracket 80 to the inflator 40. The mounting fasteners 81 of the mounting and diffuser bracket 80 are suitably attached to any vehicle 12 structure, such as the seat frame 21 or a suitable projection welded to the seat frame 21. Thus, the entire module 30 can be easily removably mounted on the vehicle 12 by the use of the mounting and diffuser bracket 80 with mounting fasteners 81 and secured in place, such as by mounting nuts 86.

Referring to FIGS. 2–4, the module 30 is preferably assembled as follows. First, the inflator 40 is attached to the mounting and diffuser bracket 80. The inflator 40 is axially slid into the first apertured bracket end 83 of the mounting and diffuser bracket 80 with the threaded end portion 46 of the discharge end 43 leading. It will be appreciated that the first apertured bracket end 83 is preferably larger than the body portion 41 of the inflator 40 for easy insertion of the body portion 41 therethrough. The inflator 40 is axially slid until the first apertured bracket end 83 is aligned on the solid end 42 of the body portion 41 and until the threaded end portion 46 extends through the second apertured bracket end 84. In this axial position, it will be appreciated that the diffuser portion 90 is axially aligned and generally concentric with the discharge ports 44 and substantially surrounds the discharge ports 44 on the discharge end 43. Then, the end nut 85 is secured to the threaded end portion 46 to securely attach and position the inflator 40 to the mounting and diffuser bracket 80.

After the inflator 40 is secured to mounting and diffuser bracket 80, both are inserted through the opening of the air bag 50 such that the mounting and diffuser bracket 80 and the inflator 40 are both substantially contained within the air bag 50. Thus, the mounting and diffuser bracket 80 is substantially internal to the air bag 50 with the exception of the mounting fasteners 81. Since the mounting and diffuser bracket 80 including the diffuser portion 90 is located within the air bag 50, the diffuser portion 90 can be used to directly redirect and diffuse inflator gas more evenly into the air bag 50. The air bag 50 is folded into a compact shape preferably to complete the air bag subassembly. Finally, the air bag subassembly including the air bag 50, the inflator 40, and the mounting and diffuser bracket 80 may be inserted within the container 60 for storage prior to air bag inflation. Preferably, the mounting fasteners 81 of the mounting and diffuser bracket 80 extend out through the air bag 50 and the container 60. As best shown in FIG. 1, the module 30 may then be attached to any suitable vehicle 12 structure and is particularly well-adapted for use in narrow vehicle locations with limited space such as the seat back 20 or seat bottom 19 or vehicle roof or side structure. The module 30 is preferably attached to the seat frame 21 of the seat back 20 by simply securing the mounting fasteners 81 to the seat frame 21, such as by use of mounting nuts 86.

The diffuser portion 90 redirects and diffuses inflator gas while providing heat protection to the air bag 50 during the discharge of inflator gas, as will now be described. Upon the sensing of predetermined vehicle 12 conditions, the inflator 40 generates inflator gas which is discharged at a high velocity in a radially outward direction out through the discharge ports 44 localized on the discharge end 43 of the inflator. The central portion 82 of the mounting and diffuser bracket 80 is securely restrained and prevented from deformation during air bag inflation by the attachment of the mounting fasteners 81 to the seat frame 21. However, as the inflator gas is discharged radially outward, the inflator gas engages the wing portions 75, 76 of the diffuser portion 90 and also the second laterally bent apertured bracket end 84 and the inflator gas is generally redirected in a generally inward axial direction along the length of the inflator 40 for more even distribution into the air bag 50. Also during the discharge of inflator gas, the first and second wing portions 75, 76 are preferably deformed radially outward by the discharging inflator gas to the deformed position as shown in FIG. 4 and in phantom lines in FIG. 2. The radially outward wing portions 75, 76 in the deformed condition continue to redirect and diffuse the discharging inflator gas along the axial the length of the inflator 40 and also partially in a lateral direction for more even distribution into the air bag 50. As best shown in FIG. 2, the wing portions 75, 76 need not deform an equal amount. Preferably, the amount of deformation of the wing portions 75, 76 in the outward radial direction can be controlled by the material properties or by the interaction of the wing portions 75, 76 with the surrounding components, such as the container 60. As best shown in FIG. 2, the first wing portion 75 opens more than the second wing portion 76 to bias the inflator gas in a laterally outboard direction for biasing the air bag 50 in the laterally outboard direction to the inflated condition.

Advantageously, the initially undeformed shape of the wing portions 75, 76 of the diffuser portion 90 permits the mounting and diffuser bracket 80 to be more compact during assembly and easier to insert internally within a smaller opening in the air bag 50 during assembly. Furthermore, the diffuser portion 90 advantageously serves the additional function of preventing the compactly folded air bag from being exposed to the heat generated by the inflator 40 since the diffuser portion 90 is located between the discharge ports 44 and the air bag 50. Also advantageously, as the wings portions 75, 76 open radially outward to the deformed condition, the wing portions 75, 76 also push the closely packed air bag 50 radially outward away from the discharge end 43 of the inflator 40 to further protect the air bag 50 from inflator heat. Preferably, typical fabric heat shields in the air bag 50 can be eliminated. During the discharge of inflator gas, the force of the inflating air bag 50 breaks out through the cover door 62 as shown in FIG. 2 and the air bag 50 deploys in a generally forward and laterally outboard direction between the door 14 and the seat 18. Also advantageously, the mounting and diffuser bracket 80 may be used to direct all of the loads during deployment in a downwardly direction into the central portion 82 and into the vehicle 12, and not into the container 60 or other air bag housing.

It will be appreciated that the mounting and diffuser bracket 80 preferably serves the multiple functions of securing the inflator 40, air bag 50 and container 60 to the vehicle 12, of redirecting and diffusing the discharging inflator gas more evenly into the air bag 50, and of providing a heat shield for the air bag 50.

It will be understood that a person skilled in the art may make modifications to the preferred embodiment shown herein within the scope and intent of the claims. Although the preferred embodiment preferably shows two wing portions 75, 76 surrounding the discharge ports 44, it will be appreciated that one wing portion that wraps substantially around the discharge end 43 and substantially surrounds the ports 44 may be used. In the case of one wing portion, a slitted opening could be left between a free end of the wing portion and the central portion 82 on the outboard side of the module 30 such that inflating gas is biased in a laterally outboard direction in addition to being directed axially inward along the inflator 40 as the wing portion deforms. It will further be appreciated that more than two wing portions 75, 76 may also be used. It will also be appreciated that the wing portions 75, 76 may have unequal lengths and unequal stiffness or material thickness such that the wing portions 75, 76 could be tuned to deform different amounts depending on the desired direction of diffusion of the inflator gas. It will further be appreciated that the wing portions 75, 76 need not be deformable, but may remain undeformed during inflation such as by having increased material stiffness or by providing a strap or band around the wing portions 75, 76.

Figure 5:
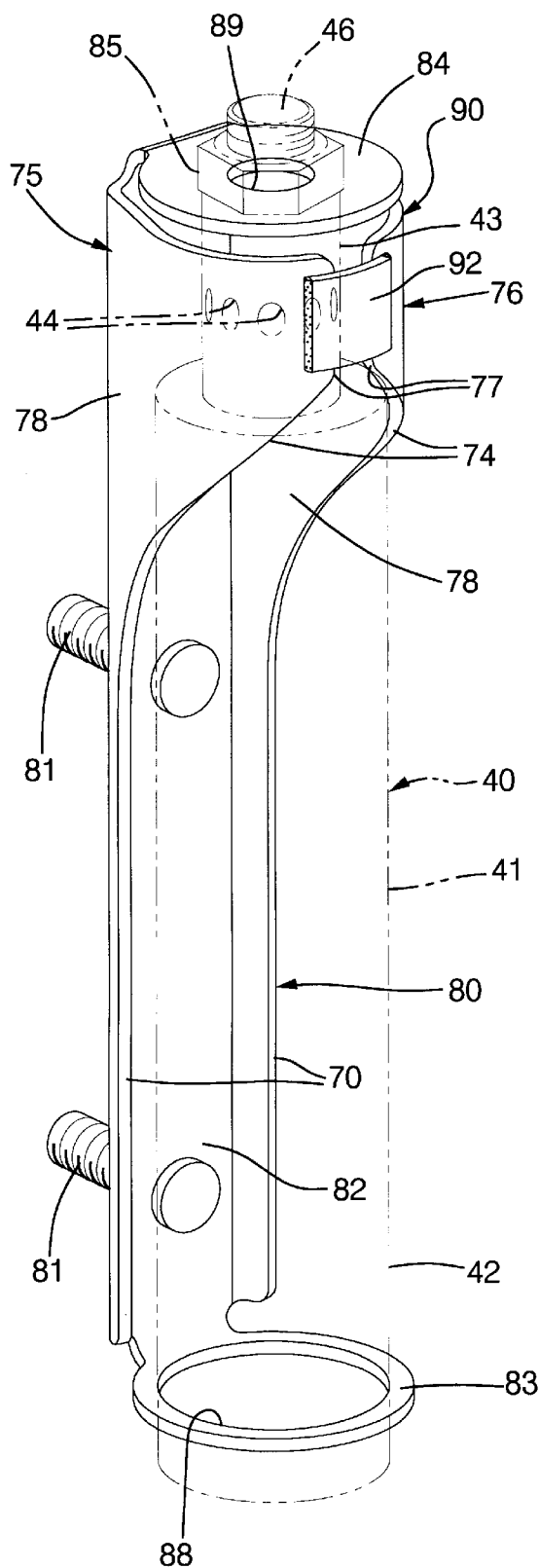
FIG. 5 is a view similar to FIG. 3, but showing an alternate embodiment of the mounting and diffuser bracket.

Depending on the desired diffusion and directing of the inflator gas, it may be desirable that the wing portions 75, 76 not deform. However, it may still be desirable to form the diffuser portion 90 with wing portions 75, 76 since the mounting and diffuser bracket 80 is integrally formed form a single piece of material which is bent to shape for ease of manufacturability. Thus, FIG. 5 shows an alternate embodiment of the invention having the same description as the embodiment of FIGS. 1–4 and described with the same numerals, but in which the wing portions 75, 76 of the diffuser portion 90 are not deformable during the discharge of inflator gas. The mounting and diffuser bracket 80 includes a connector portion 92 that operatively connects the free ends 77 of the wing portions 75, 76 to each other, such as by welding the connector portion 92 to each of the wing portions 75, 76. The slitted opening is eliminated and the wing portions 75, 76 cannot move relative to each other or deform radially outward during the discharge of inflator gas. Thus, the inflation gas is continuously directed generally axially inward along the inflator 40.

Figure 6:
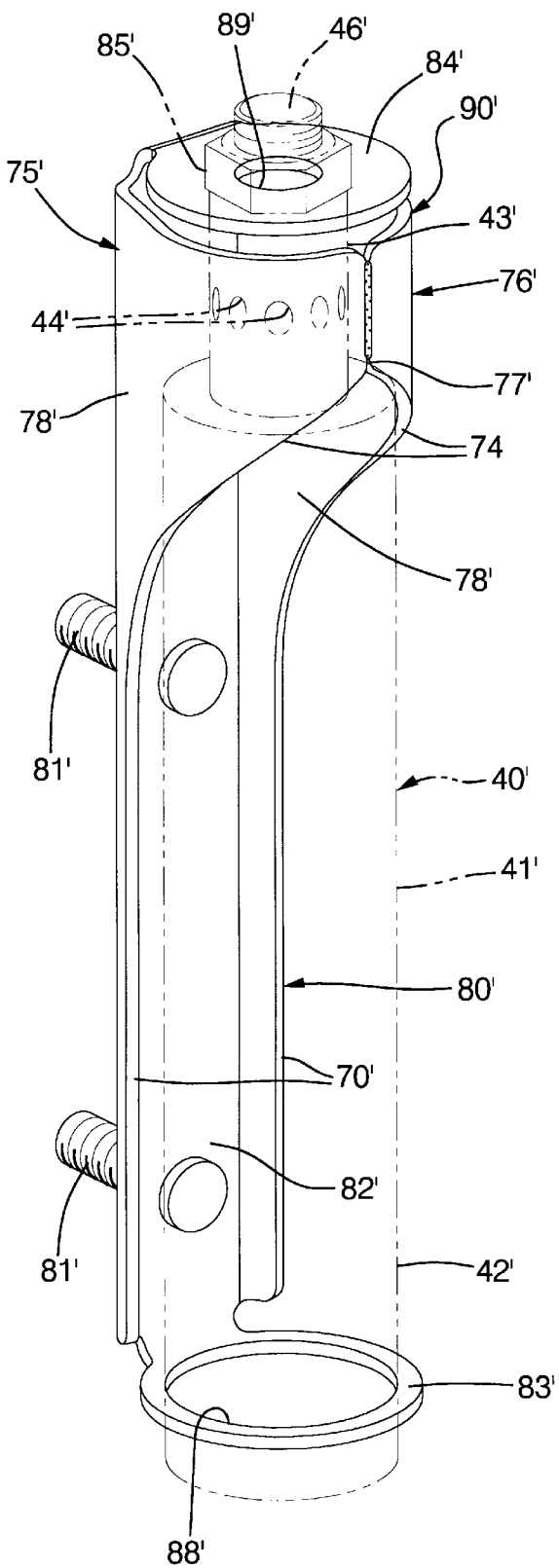
FIG. 6 is a view similar to FIG. 3, but showing another alternate embodiment of the mounting and diffuser bracket.

FIG. 6 shows yet another alternate embodiment of the invention having a description similar to that of FIGS. 1–4 and in which similar components are denoted by similar numerals with a prime. The mounting and diffuser bracket 80' includes wing portions 75', 76' having free ends 77' and hinged ends 78'. However, the wing portions 75', 76' are not deformable since the free ends 77' are operatively connected to each other, such as by welding, to form a diffuser portion 90' which is integrally formed with the mounting and diffuser bracket 80'. The slitted opening 79 is eliminated and the wing portions 75', 76' cannot move relative to each other or deform radially outward during the discharge of inflator gas. Thus, the inflator gas is continuously directed generally axially inward along the inflator 40'.

Figure 7:
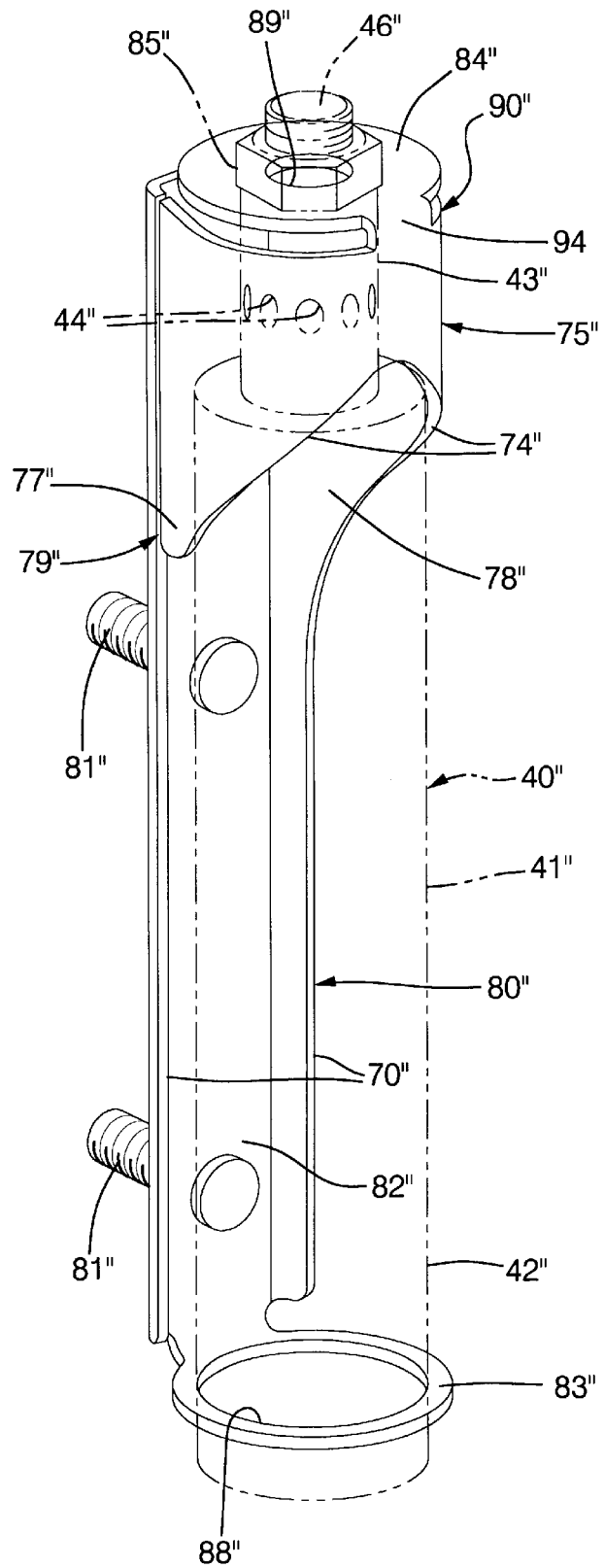
FIG. 7 shows yet another alternate embodiment of the mounting and diffuser bracket having a single wing portion.

It will be understood that a person skilled in the art may make further modifications to the preferred embodiment shown herein within the scope and intent of the claims. For example, FIG. 7 shows yet another alternate embodiment of the invention in which similar components having a similar description are denoted by similar numbers with a double prime and the variations from the above embodiments are described below. A mounting and diffuser bracket 80" includes an axially elongated central portion 82" and laterally bent first and second apertured bracket ends 83", 84". The first apertured bracket end 83" has a first end opening 88" sized for receiving the solid end 42" of the inflator 40" therein and the second apertured bracket end 84" has a second end opening 89" sized for receiving the threaded end portion 46" of the discharge end 43" therein. However, it will be appreciated that the second laterally bent bracket end 84" is not connected to the central portion 82" as in the prior embodiments. Instead, the second laterally bent bracket end 84" is only connected to the wing portion 75" of the mounting and diffuser bracket 80" and advantageously anchors the wing portion 75" by attachment to the threaded end portion 46" of the inflator 40" as shown in FIG. 7 and as further described below. The first and second end openings 88", 89" preferably have centers which are coaxially aligned such that the elongated axis of the inflator 40" extends parallel to, but spaced above, the elongated central portion 82" of the mounting and diffuser bracket 80" in the assembled condition. The mounting and diffuser bracket 80" further includes outwardly projecting mounting fasteners 81" connected to the central portion 82" for attachment to the vehicle.

The mounting and diffuser bracket 80" further includes a diffuser portion 90" which is preferably concentric with the discharge end 43" of the inflator 40" and is positioned radially outward of the discharge end 43" of the inflator 40". The diffuser portion 90" substantially surrounds the discharge ports 44" of the inflator 40" and is spaced radially outward therefrom. The diffuser portion 90" preferably includes one wing portion 75" generally concentric with the discharge 43".

The diffuser portion 90" including wing portion 75" is positioned generally axially inward of the second laterally bent bracket end 84" of the mounting and diffuser bracket 80" and is preferably attached to the second laterally bent bracket end 84" to advantageously limit movement of the wing portion 75" during the discharge of inflator gas. Preferably, the wing portion 75" is attached to the second laterally bent bracket end 84" such as by a connector strip 94 which is preferably integrally formed with the mounting and diffuser bracket 80". Thus, the mounting and diffuser bracket 80" including the diffuser portion 90" with wing portion 75" and including the second laterally bent bracket end 84" and connector strip 94 are preferably integrally formed from a single piece of material, preferably being metal. It will be appreciated that the entire mounting and diffuser bracket 80" is preferably stamped from a single planar piece of metal and then bent to the final shape of the mounting and diffuser bracket 80" for ease of manufacturing. It will be appreciated that other materials such as plastic or composites could also be used to integrally form the mounting and diffuser bracket 80", such as by molding.

The diffuser portion 90" including wing portion 75" advantageously redirects and diffuses the discharging inflator gas more evenly throughout the air bag during inflation. In addition, the diffuser portion 90" advantageously is positioned between the discharge ports 44" and the air bag (not shown, but refer to air bag 50 in FIG. 2) for protecting the air bag from heat associated with the discharging inflator gas and preferably eliminating the need for a separate heat shield in the air bag. The mounting and diffuser bracket 80" including the diffuser portion 90" can accomplish these objectives by advantageously being located internal to the air bag when the module is assembled.

The wing portion 75" includes a free end 77" and an opposite end 78". The opposite end 78" is integrally attached to the central portion 82". The free end 77" of the wing portion 75" defines an axially extending slitted opening 79" between the wing portion 75" and the central portion 82". The wing portion 75" preferably includes tapered portions 74" positioned axially inward of the discharge end 43". The mounting and diffuser bracket 80" further includes axially elongated flared rib portions 70" extending substantially along the axial length of the central portion 82" between the first bracket end 83" and the tapered portions 74" of the wing portions 75". The flared rib portions 70" extend generally upward and outward from the central portion 82" for stiffening the central portion 82" and for assisting with the redirection and diffusion of inflator gas into the air bag. The flared rib portions 70" preferably have a height which is significantly less than the height of the wing portions 75".

The diffuser portion 90" redirects and diffuses inflator gas while providing heat protection to the air bag during the discharge of inflator gas as will now be described. Upon the sensing of predetermined vehicle conditions, the inflator 40" generates inflator gas which is discharged at a high velocity in a radially outward direction out through the ports 44" localized on the discharge end 43" of the inflator. The central portion 82" of the mounting and diffuser bracket 80" is securely restrained and prevented from deformation during air bag inflation by the attachment of the mounting fasteners 81" to the vehicle. As the inflator gas is discharged radially outward, the inflator gas engages the wing portion 75" of the diffuser portion 90" and also the second laterally bent apertured bracket end 84" and the inflator gas is generally redirected in a generally inward axial direction along the length of the inflator 40" for more even distribution into the air bag. Preferably in this embodiment, radial deformation of the wing portion 75" is limited by the connector strip 94 which anchors the wing portion 75" to the second laterally bent bracket end 84" which is in turn secured to the threaded end portion 46" of the inflator 40". It will be appreciated that deformation of the wing portion 75" can also be controlled by the material properties and thickness of the wing portion 75". The wing portion 75" redirects and diffuses the discharging inflator gas along the axial the length of the inflator 40" for more even distribution into the air bag. In addition, the size of the slitted opening 79" may be varied to redirect and diffuse the discharging gas also partially in the laterally outboard direction. Thus, this embodiment provides an alternate arrangement which may be used when it is desirable to limit or eliminate deformation of the wing portion 75" and provide a more cup-shaped diffuser portion 90" in conjunction with the laterally bent bracket end 84".

It will be appreciated that the mounting and diffuser bracket 80" preferably serves the multiple functions of securing the inflator 40" and air bag to the vehicle, of redirecting and diffusing the discharging inflator gas more evenly into the air bag, and of providing a heat shield for the air bag.

It will be appreciated that further modifications could be made to the embodiment of FIG. 7. For example, the connector strip 94 could vary in size and location and could connect more of the wing portion 75" to the second laterally bent bracket end 84". In addition, it will be appreciated that the wing portion 75" could also be welded to the second laterally bent bracket end 84" around a portion or most of the perimeter of the wing portion 75". Further, it will be appreciated that while the mounting and diffuser bracket 80"

is preferably formed from a single integral piece of material, it need not be and could be made from several pieces bonded, welded or otherwise joined together. It will further be appreciated that the wing portion 75" need not be attached to the second laterally bent bracket end 84" if it is desired that the wing portion 75" be deformable during the discharge of inflator gas, as was described above with respect to FIGS. 1–4. In that case, the wing portion 75" could pivot open and radially outward about the opposite end 78" to a deformed condition during the discharge of inflator gas.

While the present embodiment has been described as carried out in a specific embodiment thereof, it is not intended to be limited thereby, but is intended to cover the invention broadly within the scope and spirit of the claims.

What is claimed is:

1. An air bag module for attachment to a vehicle, the module comprising:

an axially elongated inflator for generating inflator gas, the inflator including an axially elongated body portion and a discharge end having discharge ports for discharging inflator gas therethrough;

an air bag deployable upon generation of inflator gas;

a mounting and diffuser bracket attached to the inflator, the inflator and mounting and diffuser bracket being positioned substantially within the air bag, the mounting and diffuser bracket for securing the inflator and air bag to the vehicle, the mounting and diffuser bracket including a diffuser portion positioned radially outward of the discharge end of the inflator, the diffuser portion substantially surrounding the discharge ports of the inflator whereby upon discharge of gas by the inflator, the diffuser portion redirects and diffuses the discharging inflator gas into the air bag and provides a heat shield between the air bag and the discharge end of the inflator;

the mounting and diffuser bracket including a laterally bent end for capturing the discharge end of the inflator therein at a location axially outward of the discharge ports and the diffuser portion being positioned generally axially inward of the laterally bent end; and the diffuser portion including at least one wing portion substantially surrounding the discharge ports, the wing portion being operatively connected to the laterally bent end for limiting movement of the wing portion during the discharge of inflator gas.

2. The air bag module of claim 1 wherein the mounting and diffuser bracket includes a connector strip extending between and connecting the wing portion to the laterally bent bracket end.

3. The air bag module of claim 2 wherein the mounting and diffuser bracket is formed from a single integral planar piece of material being bent to the shape of the mounting and diffuser bracket including the laterally bent end, wing portion, and connector portion.

4. The air bag module of claim 1 wherein the wing portion is made of a solid material such that inflation gas is deflected around the wing portion.

5. The air bag module of claim 1 wherein the discharge ports are positioned only at a longitudinal end of the inflator being less than half a length of the inflator and wherein the wing portion has a length corresponding to the length of the discharge ports on the inflator.

6. An air bag module for attachment to a vehicle, the module comprising:

an axially elongated inflator for generating inflator gas, the inflator including an axially elongated body portion and a discharge end having discharge ports for discharging inflator gas therethrough:

an air bag deployable upon generation of inflator gas;

a mounting and diffuser bracket attached to the inflator, the inflator and mounting and diffuser bracket being positioned substantially within the air bag, the mounting and diffuser bracket for securing the inflator and air bag to the vehicle, the mounting and diffuser bracket including a diffuser portion positioned radially outward of the discharge end of the inflator, the diffuser portion substantially surrounding the discharge ports of the inflator whereby upon discharge of gas by the inflator, the diffuser portion redirects and diffuses the discharging inflator gas into the air bag and provides a heat shield between the air bag and the discharge end of the inflator;

the diffuser portion including at least one wing portion substantially surrounding the discharge ports; and the wing portion being deformable and wherein the wing portion moves between an undeformed condition prior to the discharge of inflator gas and a deformed condition upon discharge of inflator gas by the inflator and wherein the wing portion is spaced further radially outward from the discharge ports in the deformed condition than in the undeformed condition.

7. The air bag module of claim 6 wherein the wing portion is made of a solid material such that inflation gas is deflected around the wing portion.

8. The air bag module of claim 6 wherein the discharge ports are positioned only at a longitudinal end of the inflator being less than half a length of the inflator and wherein the wing portion has a length corresponding to the length of the discharge ports on the inflator.

9. The air bag module of claim 6 wherein the diffuser portion includes two wing portions cooperating to substantially surround the discharge ports.

10. The air bag module of claim 9 wherein the wing portions are deformable and wherein the wing portions move between the undeformed condition prior to the discharge of inflator gas and the deformed condition upon discharge of inflator gas by the inflator and wherein the wing portions are spaced further radially outward from the gas discharge ports and from each other in the deformed condition than in the undeformed condition.

11. The air bag module of claim 10 wherein the wing portions each include a free end and an opposite hinged end and wherein the wing portions pivot open about the hinged ends to the deformed condition upon the discharge of inflator gas.

12. The air bag module of claim 11 wherein the free ends of the wing portions define a slitted opening therebetween when the wing portions are in the undeformed condition and wherein the slitted opening is enlarged when the wing portions are moved radially outward to the deformed condition.

13. An air bag module for attachment to a vehicle, the module comprising:

an axially elongated inflator for generating inflator gas, the inflator including an axially elongated body portion and a discharge end having discharge ports for discharging inflator gas therethrough;

an air bag deployable upon generation of inflator gas;

a mounting and diffuser bracket attached to the inflator, the inflator and mounting and diffuser bracket being positioned substantially within the air bag, the mounting and diffuser bracket for securing the inflator and air bag to the vehicle, the mounting and diffuser bracket including a diffuser portion positioned radially outward of the discharge end of the inflator, the diffuser portion substantially surrounding the discharge ports of the inflator whereby upon discharge of gas by the inflator, the diffuser portion redirects and diffuses the discharging inflator gas into the air bag and provides a heat shield between the air bag and the discharge end of the inflator;

the diffuser portion including at least one wing portion substantially surrounding the discharge ports; and the mounting and diffuser bracket including a central portion adapted to be secured to the vehicle and wherein the wing portion extends radially outward from the central portion for substantially surrounding the gas discharge ports.

14. The air bag module of claim 13 wherein the diffuser portion includes two wing portions cooperating to substantially surround the discharge ports.

15. The air bag module of claim 14 wherein the wing portions are deformable and wherein the wing portions move between an undeformed condition prior to the discharge of inflator gas and a deformed condition upon discharge of inflator gas by the inflator and wherein the wing portions are spaced further radially outward from the gas discharge ports and from each other in the deformed condition than in the undeformed condition.

16. The air bag module of claim 15 wherein the wing portions each include a free end and an opposite hinged end and wherein the wing portions pivot open about the hinged ends to the deformed condition upon the discharge of inflator gas.

17. The air bag module of claim 16 wherein the free ends of the wing portions define a slitted opening therebetween when the wing portions are in the undeformed condition and wherein the slitted opening is enlarged when the wing portions are moved radially outward to the deformed condition.

18. The air bag module of claim 13 wherein the wing portion is made of a solid material such that inflation gas is deflected around the wing portion.

19. The air bag module of claim 13 wherein the discharge ports are positioned only at a longitudinal end of the inflator being less than half a length of the inflator and wherein the wing portion has a length corresponding to the length of the discharge ports on the inflator.

20. The air bag module of claim 13 wherein the wing portion is deformable and wherein the wing portion moves between an undeformed condition prior to the discharge of inflator gas and a deformed condition upon discharge of inflator gas by the inflator and wherein the wing portion is spaced further radially outward from the discharge ports in the deformed condition than in the undeformed condition.

21. An air bag module for attachment to a vehicle, the module comprising:

an axially elongated inflator for generating inflator gas, the inflator including an axially elongated body portion and a discharge end having discharge ports for discharging inflator gas therethrough;

an air bag deployable upon generation of inflator gas;

a mounting and diffuser bracket attached to the inflator, the inflator and mounting and diffuser bracket being positioned substantially within the air bag, the mounting and diffuser bracket for securing the inflator and air bag to the vehicle, the mounting and diffuser bracket including a diffuser portion positioned radially outward of the discharge end of the inflator, the diffuser portion substantially surrounding the discharge ports of the inflator whereby upon discharge of gas by the inflator, the diffuser portion redirects and diffuses the discharging inflator gas into the air bag and provides a heat shield between the air bag and the discharge end of the inflator;

the diffuser portion including two wing portions cooperating to substantially surround the discharge ports; and the inflator having a solid end axially opposing the discharge end and wherein the mounting and diffuser bracket has a central portion adapted to be secured to the vehicle, the central portion being axially elongated and extending generally between the ends of the inflator and wherein the wing portions each include a tapered portion positioned axially inward of the discharge end and terminating in an axially elongated flared rib portion extending substantially along the central portion towards the solid end and extending generally upward from the central portion.

22. An air bag module for attachment to a vehicle, the module comprising:

an axially elongated inflator for generating inflator gas, the inflator including an axially elongated body portion and a discharge end having discharge ports for discharging inflator gas therethrough:

an air bag deployable upon generation of inflator gas;

a mounting and diffuser bracket attached to the inflator, the inflator and mounting and diffuser bracket being positioned substantially within the air bag, the mounting and diffuser bracket for securing the inflator and air bag to the vehicle, the mounting and diffuser bracket including a diffuser portion positioned radially outward of the discharge end of the inflator, the diffuser portion substantially surrounding the discharge ports of the inflator whereby upon discharge of gas by the inflator, the diffuser portion redirects and diffuses the discharging inflator gas into the air bag and provides a heat shield between the air bag and the discharge end of the inflator;

the diffuser portion including two wing portions cooperating to substantially surround the discharge ports;

the mounting and diffuser bracket including a central portion adapted to be secured to the vehicle and the wing portions extending radially outward in opposing directions from the central portion for substantially surrounding the discharge ports; and the wing portions each having a hinged end connected to the central portion and each of the wing portions having a free end opposite the hinged end and wherein the wing portions have an undeformed condition prior to the discharge of inflator gas and wherein the wing portions pivot open about the hinged ends to a deformed condition upon the discharge of inflator gas.

23. The air bag module of claim 22 wherein the free ends are spaced apart from each other to define a slitted opening therebetween when the wing portions are in the undeformed condition and wherein the slitted opening is enlarged when the wing portions are moved to the deformed condition.

* * * * *